Jan. 14, 1969          W. P. ROWLAND          3,421,805
CHANGING OPTICAL PATTERN DISPLAY
Filed Jan. 6, 1965

INVENTOR.
WILLIAM P. ROWLAND
BY
ATTORNEY

Jan. 14, 1969  W. P. ROWLAND  3,421,805
CHANGING OPTICAL PATTERN DISPLAY
Filed Jan. 6, 1965

INVENTOR.
WILLIAM P. ROWLAND
BY
ATTORNEY

United States Patent Office 3,421,805
Patented Jan. 14, 1969

3,421,805
CHANGING OPTICAL PATTERN DISPLAY
William P. Rowland, Southington, Conn., assignor to Rowland Products Incorporated, Kensington, Conn., a corporation of Connecticut
Filed Jan. 6, 1965, Ser. No. 423,664
U.S. Cl. 350—6                                  12 Claims
Int. Cl. G02b 17/00

ABSTRACT OF THE DISCLOSURE

There is disclosed a changing optical pattern display provided by a pair of sheets of material each having a multiplicity of closely spaced curvilinear lens-like formations on one surface and a smooth surface. The two sheets of material are held with their smooth surfaces in optical contact with each other and means are provided for moving one of the sheets relative to the other while maintaining the optical contact therebetween. The lens-like formations phase in and out of axial alignment during such movement so as to produce the changing optical pattern.

---

The present invention relates to a display such as might be used in advertising or sales promotional means and more particularly is concerned with a changing optical pattern display especially adaptable to such uses. In the marketing of goods and services, it is often highly desirable to provide attention drawing signs and displays, particularly in retail selling where it is of primary importance to attract and retain direct consumer attention. Many of such displays employ moving components, vari-colored and flashing lights as well as unusual optical effects and illusions. While such devices are often satisfactorily effective in gaining attention, they nonetheless may be inherently based upon a complex, intricate, and relatively expensive device or mechanism as to both initial cost and subsequent maintenance.

In my co-pending United States application Ser. No. 261,385 filed Feb. 27, 1963, and entitled, Sheet Material for Optical Effects and Methods of Making Same, now United States Letters Patent No. 3,357,752, granted Dec. 12, 1967, there is described a novel synthetic plastic sheet material which is adapted to provide a wide range of optical effects with light rays falling thereon over a wide angle of incidence which can be advantageously employed in the present invention.

It is an object of the present invention to provide a novel, effective and relatively economical changing optical pattern display which will draw and retain the attention of an observer.

It is another object of the present invention to provide an optical pattern display having a constantly changing visual effect to the observer.

Another object is to provide such a changing optical pattern display adapted to embodiment in a variety of forms such as planar, curvilinear and cylindrical.

These and other objects, features and advantages of the present invention will be more fully understood from the following detailed description together with the accompanying drawings and its scope will be pointed out in the appended claims.

Figure 1:
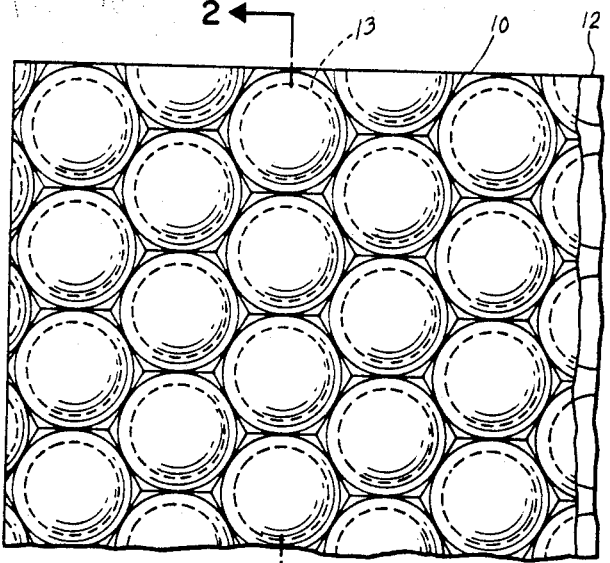
FIGURE 1 is a front elevational view illustrating two sheets of embossed material of the type which may be used in embodiments of the present invention.

The invention in its preferred embodiment comprises a changing optical pattern display which includes an assembly comprising a first sheet of material having a multiplicity of closely spaced curvilinear lens-like formations on its front surface and a smooth rear surface. A second sheet of material having a smooth front surface and a multiplicity of closely spaced reflective formations on its rear surface is positioned contiguous to the first sheet so that the smooth surfaces of the two sheets are in optical contact with each other. Means is provided for maintaining the smooth rear surface of the first sheet in optical contact with the smooth front surface of the second sheet. The term "optical contact" as used herein is intended to mean such relationship between the contiguous surfaces of the two sheets as to transmit substantially all the light rays passing through one sheet to the other sheet, i.e., the substantial absence of a reflective interface therebetween. Such means for maintaining optical contact between the two sheets may take several forms, as will be more fully explained hereinafter. Further, at least one of the two sheets is arranged and adapted to be operatively connected with means to move it relative to the other sheet while maintaining the previously described optical contact between the two smooth surfaces. As the one sheet is moved with respect to the other, the phase of axial alignment between the lens-like formations and the reflective formations is in a constant state of change producing an unusual, highly desirable, and attractive visual effect.

Although for the present invention the formations may have a variety of forms which provide optical interference effects including dots and the like printed or otherwise formed in or upon the sheet material and various discrete impressions or embossments in the transparent sheet material itself, for optimum attention-gathering effect the front surface of one sheet of material has a multiplicity of closely spaced, substantially identical curvilinear lens-like formations thereon in one pattern and the contiguous sheet has a multiplicity of closely spaced, substantially identical reflective formations in a second pattern. Both the lens-like and the reflective formations diminish in horizontal cross section along the vertical and horizontal axes of the sheet material from the base portion to provide tapering side walls and the lens-like formations are curvilinear along both horizontal and vertical axes. Since the reflective formations phase in and out of axial registry with the lens-like formations along the horizontal axes, varying optical effects are produced by variations in the angle of light rays focused by the lens-like formations onto the tapering side walls of the reflective formations.

This preferred sheet material is described in Applicant's aforementioned co-pending application Ser. No. 261,385, now United States Letters Patent No. 3,357,752, in complete detail. As pointed out therein, generally the lens-like embossments are each of a configuration which will focus substantially the light rays entering thereinto from various directions, and, accordingly, have a curvilinear convex periphery and horizontal cross section. Although parabolic configurations are the more highly efficient focusing elements, major segments of spheres, preferably approximating hemi-spheres, have also proven highly effective. Since some distortion of the spherical configuration may occur and be tolerated in the present invention, the term "spheroidal" is used herein to encompass both spherical configurations and those configurations deviating somewhat therefrom. Although the embossments on the rear or other surface may be prismatic or conical in configuration, it is far more preferable to employ convex lens-like embossments to obtain considerably greater optical activity and greater reflection as well as retroreflection.

By providing a reflective coating on the reflective formations instead of relying entirely upon the critical angle for reflection, the sheet material may be rendered more highly reflective and even more optically interesting due to accentuation of highlights and due to accentuation of reflection of incident light rays. The phasing in and out of axial alignment of the lens and reflector formations within each node or phase of the pattern produces a multiplicity of areas of dazzling brightness due to reflection of the light in bundles of parallel rays and also effectively ensures a number of lens and reflector combinations to retroreflect light rays over a wide angle of incidence.

When a vacuum metallized or chemically deposited metallic coating is applied to the rear surface, it is highly desirable that it be protected by an outer coating or lacquer, plastic film or other suitable material. For some applications, it may be desirable to overlay the rear surface of the reflectively coated sheet material with a layer of synthetic plastic or other material to provide a flat-surfaced layer which does not interfere with the reflective action of the reflective embossments.

A sheet material having reflective embossments on the rear surface thereof may provide multicolored, varying optical effects by providing a first coloring agent on a first, substantially identical portion of the embossments and a differential coloring agent on a second, substantially identical portion of the embossments. In this manner, multicolored, varying optical effects are generated by variation in the angle of incidence of light rays focused by said lens-like embossments onto varying points on said first and second colored portions of said reflective embossments.

The term "coloring agent" as used herein refers to lacquers, paints, dyes, metallic films and other materials for providing a color or intensity of color optically distinct from the color of the body of the sheet material, and the term "differential coloring agent" as used herein refers to such lacquers, paints, dyes, metallic films or other materials for providing a color or intensity of color optically distinct from other coloring agents employed and the color of the body of the sheet material.

It will be appreciated that a third or more differentially colored portions may be provided similarly. Generally, the coloring agents should cover the entire rear surface of the sheet material for optimum effect, although for some applications it may be desirable to use portions of the embossments which are free from coloring agent. Generally, the remainder of the sheet material should be substantially transparent or colorless to achieve optimum effectiveness.

The first and differential coloring agents may be applied in various ways to the sheet material such as by printing with suitably patterned plates or rolls, by coating with vaporizable solvent solutions, by vacuum metallizing, by spraying conveniently with suitable masking when both colors are applied thereby, by a roll-type applicator, by brush, by wiping, or any other suitable means to provide the coloring agent in a substantially identical location on the embossments. By use of a roller with a compressible absorbent surface for carrying the coloring agent and proper control of pressure, a doughnut-shaped or substantially toroidal band of color can be provided inwardly from the tops of the embossments.

A highly facile and economical method of producing the differential coloring of the sheet material is by first applying a first coloring agent to the tops of the reflective embossments by a roller to provide a substantially concentric crown area thereabout and then applying a differential coloring agent over the entire rear surface of the sheet with the first coloring agent being substantially unaffected thereby and masking its portion of the embossment from the differential coloring agent. This technique is particularly advantageous when a vacuum metallized film is the differential coloring agent. Another technique which has proven advantageous is that of coating the entire surface of the sheet material with a first coloring agent and then lightly abrading the tops of the embossments to remove the first coloring agent therefrom without substantially altering the configuration of the embossments, although some flattening of the tops can be tolerated. The differential coloring agent is then applied to the surface to provide a substantially concentric crown area of the differential coloring agent about the tops of the embossments. For purely visual effect, the total thickness of the sheet material may vary from about one-half to two and one-half times the focal length of the lens-like embossments on the front surface. For achieving a high degree of retroreflectivity with lens-like embossments, a highly reflective coloring agent (or agents) is applied to the major portion of the rear surface, and the thickness of the sheet should be substantially equal to the focal length of the lens-like embossments on its surface causing the light rays to focus at about the centers of the reflective embossments on the second sheet or equal to the sum of the focal lengths of the lens-like embossments on the first sheet and the lens-like mirrors on the second sheet, the former being optimum for retroreflectivity. However, a measure of variation and deviation is tolerable in the present invention since constant change of axial phasing over the axes of the sheet will result in refracted light rays striking and focusing at various points along the convexly curved surfaces fo the lens-like projections of each period or phase so as to achieve a significant amount of retroreflection from one or more combinations of embossments in various degrees of axial registration in a single phase or period of the pattern.

Various synthetic plastics may be used for the sheet material of the present invention, including acrylic acid esters such as methyl methacrylate, cellulose acetate, cellulose acetate-butyrate, cellulose proprionate, vinyl chloride and copolymers thereof, polystyrene, polycarbonates, cellulose nitrate, polypropylene and polyethylene. Laminates may be desirable to provide more highly weather- and abrasion-resistant surfaces such as by use of very thin surface films of polyethylene terephthalate.

Figure 2:
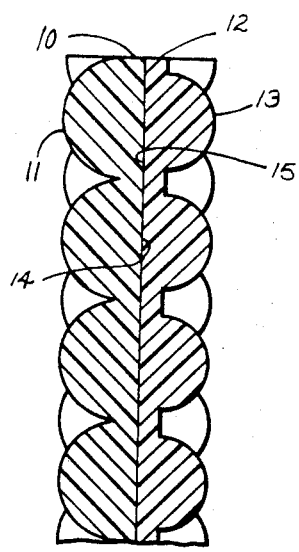
FIGURE 2 is a cross-sectional view of the two sheets of the embossed material illustrated in FIGURE 1 taken through section 2—2.

Referring now to FIGURE 1, there is shown an assembly of sheets such as may be used in one embodiment of the present invention. A first sheet 10 having a multiplicity of closely spaced curvilinear lens-like formations on its front surface such as those shown at 11 is positioned contiguously to a second sheet 12 behind it, which is provided with a multiplicity of closely spaced reflective formations such as those shown by the dash line outline at 13. As shown in FIGURE 2, the two sheets of material 10 and 12 have smooth surfaces 14 and 15, respectively, which are positioned and disposed contiguous to each other. In accordance with the concept of the present invention, the two sheets are maintained with their smooth surfaces 14 and 15 in optical contact with each other.

Figure 3:
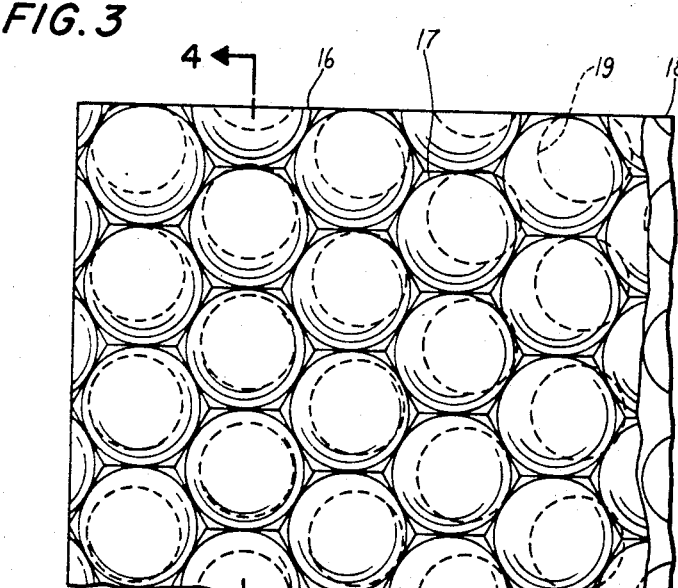
FIGURE 3 is a front elevational view of one of several variant types of embossed sheets of material which may be used in embodiments of the present invention.
Figure 4:
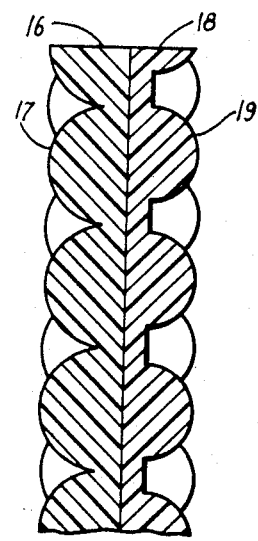
FIGURE 4 is a cross-sectional view of the embossed sheets of material illustrated in FIGURE 3 taken through section 4—4.

Referring now to FIGURE 3, there is shown a variant type of assembly which might be employed in an embodiment of the present invention. The small portions of sheets 10 and 12 illustrated in FIGURES 1 and 2 appear to have their patterns of formations in substantial axial registry; however, across full sheets of such material the axial registry of the pattern of formations on one sheet will deviate with respect to the pattern of formations on the other sheet and such deviation may be either random or relatively uniform deviation of axial registry as is illustrated in FIGURES 3 and 4. FIGURE 3 shows a sheet 16 having a multiplicity of closely spaced curvilinear lens-like formations 17 on its front surface and a smooth rear surface. A second sheet 18 of similar material has a smooth front surface and a multiplicity of closely spaced reflective formations 19 on its rear surface. However, the respective patterns of formations 17 and 19 have different spacing along several axes as may be seen from the lack of registry of the formations 17 relative to the formations 19 except at particular points where such formations happen to coincide with each other. In the cross-sectional view of FIGURE 4 the sheet 16 is seen to have a multiplicity of formations 17 similar to those illustrated in FIGURES 1 and 2 while the sheet 18 has a multiplicity of reflective formations 19 similar to those shown in FIGURES 1 and 2, the difference being the variation of axial alignment along several axes as was pointed out in the explanation of the illustration of FIGURE 3. Those skilled in the art will appreciate that many different and varied types of embossments and patterns of formations may be employed effectively within the teaching and concepts of the present invention and that the illustrations of FIGURES 1, 2, 3, and 4 are merely illustrative of two of such many variant types of embossed patterned materials which are adaptable and suitable to carrying out the teachings of the present invention.

Figure 5:
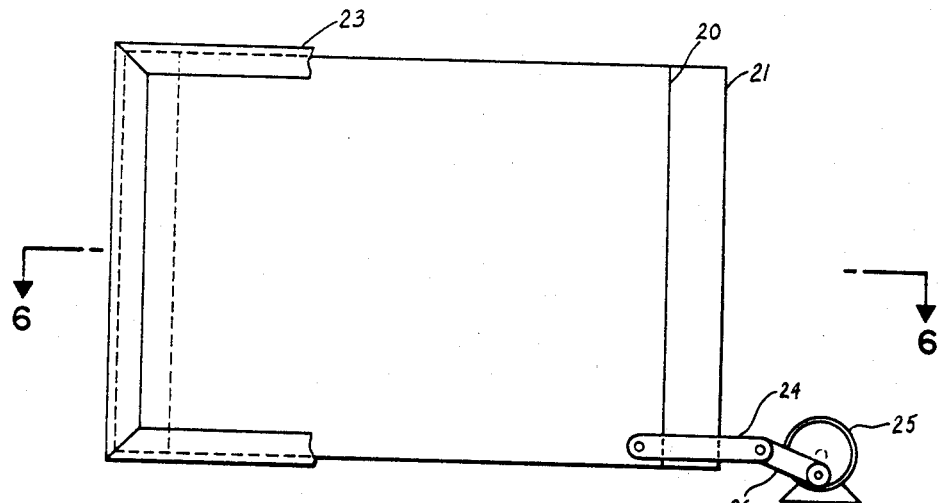
FIGURE 5 is a front elevational view of an embodiment of the present invention.

Referring now to FIGURE 5, there is illustrated a front elevational view of an embodiment of the present invention which comprises two sheets of material, shown generally at 20 and 21 of the type previously described in connection with FIGURES 1, 2, 3 and 4. The sheet 20, having a multiplicity of closely spaced curvilinear lens-like formations on its front surface and a smooth rear surface, is positioned contiguously to a second sheet 21 so that its front smooth surface is in optical contact with the smooth rear surface of sheet 20. As previously described, the sheet 21 has a multiplicity of closely spaced reflective formations on its rear surface and is adapted to produce the changing optical pattern display of the present invention. A frame 23 (partially shown) surrounds the assembly of sheets 20 and 21 supporting and maintaining sheets 20 and 21 so that their contiguous smooth surfaces are constantly in optical contact. The sheet 20 is connected through appropriate means such as the linkage 24 to a means for providing relative movement between 20 and 21. Such means may take the form of a small motor or other suitable drive mechanism of the type indicated generally at 25. Thus, sheet 20, is moved relative to sheet 21 so that the axial alignment between the lens-like formations of sheet 20 and the reflective formations of sheet 21 are in a constant state of change producing a most unusual, highly attractive, and desirable visual effect.

Figure 6:
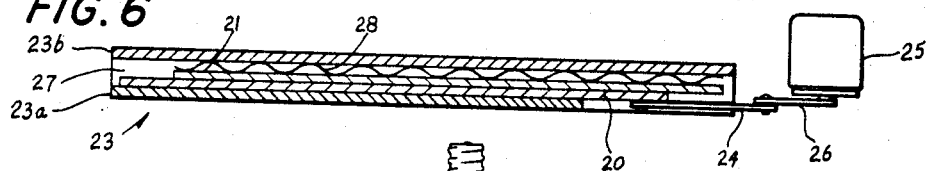
FIGURE 6 is a cross-sectional view of the embodiment of FIGURE 5 taken through section 6—6.

FIGURE 6 illustrates a cross-sectional view of the embodiment of FIGURE 5 taken through section 6–6 and like members bear the same numerical designations as in FIGURE 5. Referring now to FIGURE 6, there is shown a frame, generally indicated at 23, surrounding and supporting the assembly of the two sheets 20 and 21 as was previously described in connection with FIGURE 5. The frame 23 has a front portion 23a and a rear portion 23b and a channel 27 therebetween. The two sheets 20 and 21 are positioned and supported in the channel 27 between the front portion 23a of the frame 23 and the rear portion 23b of the frame 23. Suitable means such as the resilient spring 28 is also positioned in the channel to maintain the two sheets 20 and 21 so that their smooth contiguous surfaces are constantly in optical contact.

Figure 7:
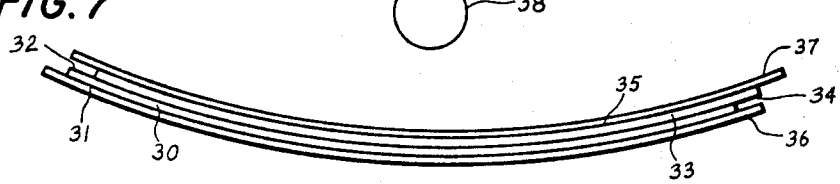
FIGURE 7 is a top elevational view illustrating a variant embodiment of the present invention.

The two sheets 20 and 21 of the embodiment illustrated by FIGURES 5 and 6 are planar in general configuration. As was previously explained in connection with the illustration of FIGURE 5, the embodiment of FIGURES 5 and 6 is arranged so that the sheet 20 is moved in a oscillatory manner. The illustration of FIGURE 7 shows a variant embodiment of the present invention in which the contiguous sheets are of curvilinear configuration rather than planar as illustrated in the embodiment of FIGURES 5 and 6. As shown in FIGURE 7, a sheet of suitable material having a multiplicity of closely spaced curvilinear lens-like formations on its front surface 31 and a smooth rear surface 32, is positioned contiguous to a sheet 33 having a smooth front surface 34 and a multiplicity of closely spaced reflective formations on its rear surface 35. The two sheets 30 and 33 are configured and positioned to assume and maintain a contiguous curvilinear disposition generally in the manner illustrated in the cross-sectional view of FIGURE 7 and with their adjacent smooth surfaces continually and constantly in optical contact.

For the purpose of maintaining and insuring such desired optical contact in accordance with the teaching and concept of the present invention, it has been found that a relatively rigid transparent plastic means such as a sheet or acrylic may be employed in the manner now to be described in connection with the illustration of FIGURE 7. A transparent rigid sheet such as that shown at 36 is affixed or secured to the sheet 30 and a similar sheet of rigid material 37 is secured and affixed to the sheet 35. The two rigid sheets 36 and 37 may be spring biased or urged toward each other by other suitable means in the manner previously described in the embodiment of FIGURES 5 and 6, and the rigidity of sheets 36 and 37 assures and maintains the sheets 30 and 33 in optical contact with each other. It has been found that one suitable material for producing the sheets of material having a multiplicity of closely spaced formations of the type employed in the present invention may be comprised of polycarbonate which is relatively flexible as contrasted to the rigid sheets 36 and 37 which may be of acrylic, for example. Further, in accordance with the concept of the present invention, the assembly as illustrated in FIGURES 5 and 6 and in FIGURE 7 as well, may be back lighted by a suitable means such as the light source 38 which may take any one of a number of forms including incandescent or fluorescent lighting.

As those skilled in the art will appreciate, multiple or varied colored light sources may be advantageously employed to accentuate and enhance the visual effects and illusions achievable in accordance with the concept and teaching of the present invention. Additionally, the two principal sheets bearing the lens-like and reflective formations may be of colored material or alternatively the supporting rigid sheets such as shown at 36 and 37 in the illustration of FIGURE 7 may be of colored material to further add to the visual effect producible as taught by the present invention.

Figure 8:
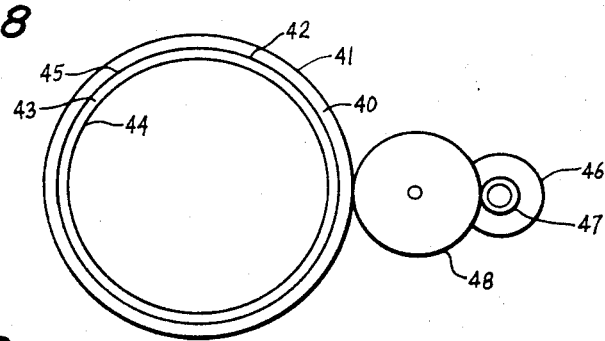
FIGURE 8 is a top elevational view illustrating yet another variant embodiment of the present invention.

Referring now to FIGURE 8, there is shown yet another variant form of the present invention which comprises two sheets having generally the same type of respective formations of embossments as taught by the present invention; however, the sheets are circular and are arranged and disposed in concentric optical contact with each other. As illustrated in FIGURE 8, an outside sheet 40 having a multiplicity of closely spaced curvilinear lens-like formations on its front surface 41 and a smooth rear surface 42 is enclosed about a second sheet 43 having a multiplicity of closely spaced reflective formations on its rear or inside surface 44 and a smooth front surface 45 arranged and disposed in constant optical contact with smooth surface 42 of the contiguous sheet 40. Such arrangement of circularly disposed concentric sheets may be moved with respect to each other so as to constantly change the phase of the axial alignment between the lens-like formations of sheet 40 and the reflective formations of sheet 43 by arranging for sheet 43 to be supported in a fixed disposition while sheet 40 is rotated or reciprocally moved in an oscillatory manner. The illustration of FIGURE 8 shows a suitable drive mechanism 46 which is arranged through its drive shaft 47 to rotate a drive wheel 48, which is in frictional contact with the outside circular sheet 40.

As will be evident to those knowledgeable in the art, the arrangement of FIGURE 8 may also be adapted to move the inside sheet 43 or both sheets 40 and 43 and may include suitable rigid covering sheets such as acrylic, for instance, employed to insure the maintenance of the two inner sheets 40 and 43 in constant optical contact in the manner previously described in connection with FIGURE 7. Additionally, the embodiment of FIGURE 8 may be lighted by the placement of suitable lighting means including colored light sources disposed within the concentrically arranged sheets 40 and 43 and such lighting means may be readily adapted to illuminate sheets 40 and 43 with moving patterns of light as is well known in the visual display arts.

Figure 9:
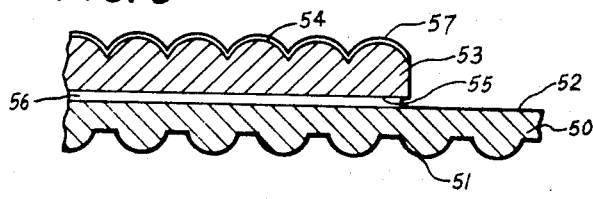
FIGURE 9 is a greatly enlarged view of one embodiment of the present invention illustrating the relationship of the operable portions of its assembly.

Referring now to FIGURE 9, there is shown two sheets of the type which are employed in the practice of the present invention, comprising a first sheet 50 having a multiplicity of closely spaced curvilinear lens formations 51 on its front surface and a smooth rear surface 52. Adjacent to the sheet 51 is a similar sheet of material 53 having a multiplicity of closely spaced reflective formations 54 on its back surface and a smooth front surface 55. Between the smooth front surface 55 of the sheet 53 and the smooth rear surface 52 of the sheet 50 there is disposed a suitable wetting agent 56 which may be any one of a number of suitable means such as water, oil, lubricant or any expedient which will conveniently maintain the optical contact between sheets 50 and 53. Additionally, as illustrated in FIGURE 9, the multiplicity of closely spaced reflective formations 54 may be coated with a reflective coating 57 to further accentuate and enhance the reflective properties of the constantly changing axial alignment of the lens-like curvilinear formations 51 of sheet 50 with the reflective formations of sheet 53.

Having thus described the invention, I claim,

1. A changing optical pattern display comprising a first sheet of material having a multiplicity of closely spaced curvilinear lens-like embodiments in a first pattern on its front surface and a smooth rear surface, a second sheet of material having a smooth front surface and a multiplicity of closely spaced reflective embossments in or second pattern on its rear surface, means maintaining the rear surface of said first sheet in optical contact with the front surface of said second sheet without an air gap so as to preclude a reflective interface therebetween, each lens-like and reflective embossment projecting on an axis perpendicular to said front and rear surfaces, each of said lens-like and reflective embossments diminishing in cross-section outwardly from said body portion in all planes which include its perpendicular axes to provide side walls tapering inwardly from said body portion towards each perpendicular axis, each of said lens-like embossments being curvilinear in cross section in all planes which include its perpendicular axis and in all planes which extend normally through its perpendicular axis, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof, and means operatively connected with at least one of said sheets to move it relative to the other sheet while maintaining said optical contact between said smooth surfaces, whereby the phase of axial alignment between said lens-like embossments and said reflective embossments is in a constant state of change, said second pattern of embossments being different from said first pattern so that said reflective embossments phase in and out of axial registry with said lens-like embossments in at least one direction of said surfaces to provide varying optical effects due to variation in the angle of incidence of light rays focused by said lens-like embossments of said front surface onto the tapering side walls of the reflective embossments of said rear surface.

2. A changing optical pattern display as claimed in claim 1 wherein at least one of said first and second sheets is moved in a parallel plane relative to the other.

3. A changing optical pattern display as claimed in claim 1 wherein the assembly of said first and second sheets is curvilinear in cross-section.

4. A changing optical pattern display as claimed in claim 1 wherein said means operatively connected with one of said sheets to move it relative to the other sheet is adapted to cause oscillatory motion therebetween.

5. A changing optical pattern display as claimed in claim 1 wherein said first and second sheets are positioned in concentric cylindrical relationship.

6. A changing optical pattern display as claimed in claim 1 wherein there is included means for backlighting said sheets.

7. A changing optical pattern display as claimed in claim 1 wherein said lens-like embossments are of a configuration which is substantially parabolic.

8. A changing optical pattern display as claimed in claim 1 wherein said reflective embossments have a reflective coating thereon.

9. A changing optical pattern display as claimed in claim 1 wherein said means maintaining said surfaces in optical contact is a wetting agent filling any void between said smooth surfaces and effecting optical contact therebetween.

10. A changing optical pattern display as claimed in claim 1 wherein said means maintaining said surfaces in optical contact includes at least one relatively rigid sheet of transparent material positioned adjacent an outer surface of one of said sheets and biasing means resiliently urging said transparent sheet against the outer surface of said one sheet to maintain said surfaces of said sheets in substantial optical contact with each other.

11. A changing optical pattern display as claimed in claim 1 wherein said means maintaining said surfaces in optical contact includes relatively rigid sheets of transparent material positioned adjacent the front surface of said first sheet and adjacent the rear surface of said second sheet and biasing means resiliently urging said transparent sheets toward each other and maintaining said first and second sheets in substantial optical contact with each other.

12. A changing optical pattern display as claimed in claim 11 wherein at least one of said transparent sheets is of a colored material.

References Cited

UNITED STATES PATENTS

| | | | |
|---|---|---|---|
| 1,475,430 | 11/1923 | Curwen | 88—1 |
| 1,869,276 | 7/1932 | Precourt | 88—1 |
| 2,419,216 | 4/1947 | Hotchner | 40—106.53 |
| 3,312,006 | 4/1967 | Rowland | 350—167 |

DAVID SCHONBERG, *Primary Examiner.*

R. J. STERN, *Assistant Examiner.*

U.S. Cl. X.R.

40—106.53; 350—167